United States Patent
Stoddart et al.

(10) Patent No.: US 8,103,055 B2
(45) Date of Patent: Jan. 24, 2012

(54) DETECTION OF BLOBS IN IMAGES

(75) Inventors: Andrew John Stoddart, Oxford (GB); Emli-Mari Nel, Oxford (GB)

(73) Assignee: OMG PLC, Oxford (GB)

( * ) Notice: Subject to any disclaimer, the term of this patent is extended or adjusted under 35 U.S.C. 154(b) by 1049 days.

(21) Appl. No.: 12/013,012

(22) Filed: Jan. 11, 2008

(65) Prior Publication Data
US 2009/0180663 A1 Jul. 16, 2009

(51) Int. Cl.
*G06K 9/00* (2006.01)
(52) U.S. Cl. .................................................... 382/103
(58) Field of Classification Search .................. 382/103, 382/151, 154, 199, 203
See application file for complete search history.

(56) References Cited

U.S. PATENT DOCUMENTS
5,598,481 A 1/1997 Nishikawa et al.

OTHER PUBLICATIONS

R. Gonzalez, R, Woods, Digital Image Processing, Second Edition, Prentice Hall, 2002, pp. 66-68, 119-123, 273-276.
M. R. Shortis, T. Clarke, T. Short, A comparison of some techniques for the subpixel location of discrete target images, in: In Proceedings of the SPIE: Videometrics III, vol. 2350, 1994, pp. 239-250.
D. Claus, A. Fitzgibbon, Reliable fiducial detection in natural scenes, in: Proceedings of the 8th European Conference on Computer Vision, Prague, Czech Republic, vol. 3024, Springer-Verlag, 2004, pp. 469-480.
B. H. Menze, B. M. Kelm, F. A. Harnprecht, From eigenspots to fisherspots—latent spaces in the nonlinear detection of spot patterns in a highly varying background (2006).
D. Blostein, N. Ahuja, A multiscale region detector, Computer Vision, Graphics, and Image Processing 45 (1) (1989) 22-41.
K. Mikolajczyk, C. Schmid, A performance evaluation of local descriptors, IEEE Transactions on Pattern Analysis & Machine Intelligence 27 (10) (2005) 1615-1630.
S. Hinz, Fast and subpixel precise blob detection and attribution, in: ICIP05, 2005, pp. III: 457-460.
T. Lindeberg, Feature detection with automatic scale selection, International Journal of Computer Vision 30 (2) (1998) 79-116.
M. Shneier, Using pyramids to define local thresholds for blob detection, PAMI 5 (3) (1983) 345-349.
A. Neubeck, L. Van Gool, Efficient non-maximum suppression, 2006, pp. III:850-855.
Extended European Search Report regarding Application No. 09250051.1 dated Mar. 23, 2009.
Cheng-Chung L et al. "Extracting Facial Features by an Inhibitory Mechanism Based on Gradient Distributions" Pattern Recognition, Elsevier, GB, vol. 29, No. 12, Dec. 1, 1996, pp. 2079-2101.
Schilham A M R et al, "A Computer-Aided Diagnosis System for Detection of Lung Nodules in Chest Radiographs with an Evaluation on a Public Database", Medical Image Analysis, Oxford University Press, Oxford, GB vol. 10, No. 2, Apr. 1, 2006 pp. 247-258.

*Primary Examiner* — Daniel Mariam
(74) *Attorney, Agent, or Firm* — Harness, Dickey & Pierce, P.L.C.

(57) ABSTRACT

Blobs are detected in an image using closed curves having a predetermined shape such as a circle. Positions in the image are analysed. The size is determined at which there is a maximum in the differential of the average intensity around a closed curve with respect to the size of the closed curve. Detection scores are derived, representing the proportion of rays, out of a plurality of rays crossing a closed curve of the determined size, along which the intensity differential across the closed curve exceeds a contrast threshold. Detection of blobs is performed on the basis of the detection scores exceeding a threshold. Pixels of a detected blob are segmented for calculation of a centroid using a blob-separation threshold which is the average intensity around the closed curve of the determined size. The technique allows accurate and rapid detection of blobs of the predetermined shape.

76 Claims, 9 Drawing Sheets

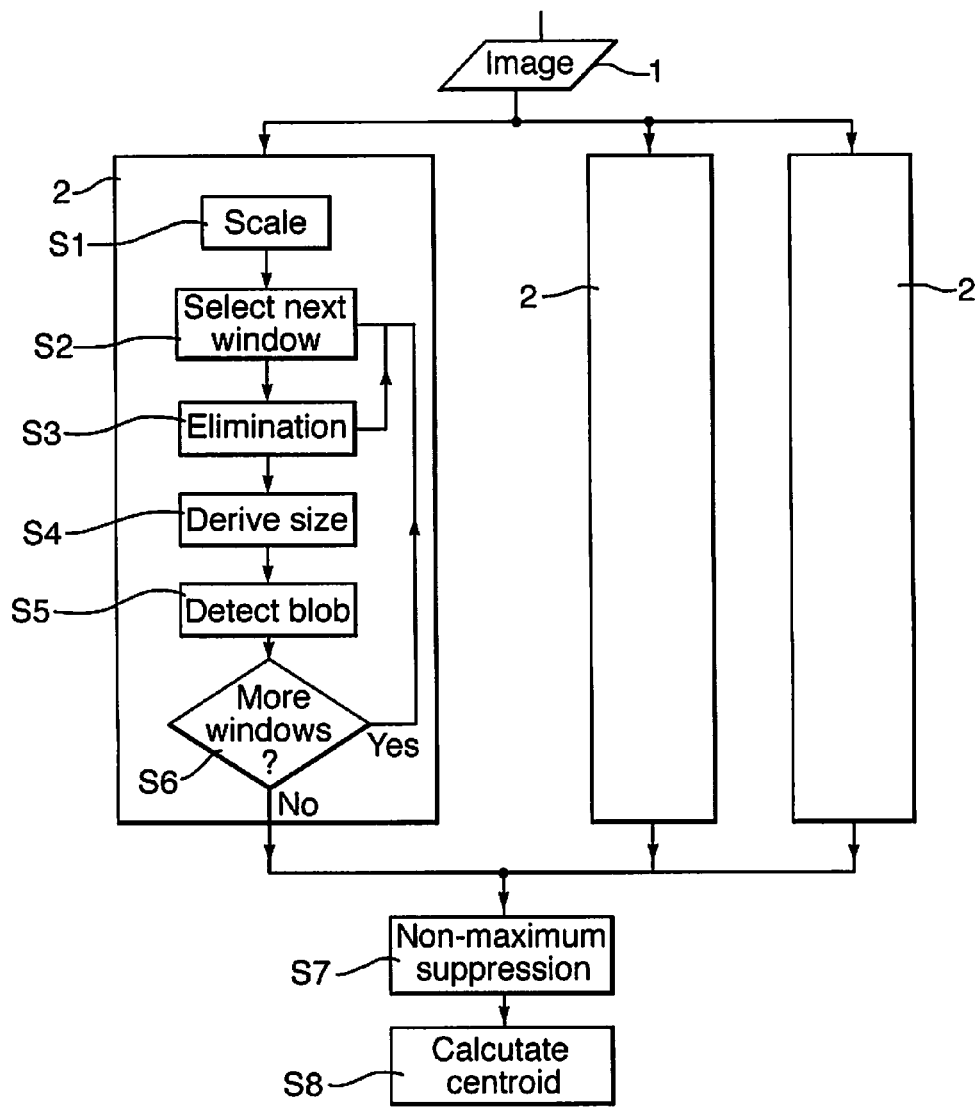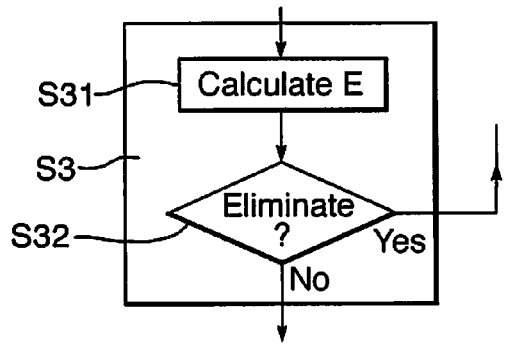

Profiles after performing linear interpolation on the NN solution

DETECTION OF BLOBS IN IMAGES

BACKGROUND OF THE INVENTION (1) Field of the Invention

The present invention relates in general to the detection of feature points in images, and more specifically to the detection of blobs. A blob is a particular type of feature point comprising a region in the image that has different intensity from the surrounding area.

(2) Description of Related Art

Blob detection has a large number of uses for example in optical motion capture and photogrammetry. In many such applications, it is desired to detect accurately the position of feature points in images. For example, in optical motion capture a fiducial or marker is applied to an object, such as a person. The fiducial forms a blob in an optical image of the object. The position of the blob in the image is detected.

A large number of blob detection techniques are known. Most of these known blob detection techniques detect regions where the contrast between foreground and background intensities are high.

A simple known technique for blob detection is thresholding. Blobs are detected by detecting regions of pixels exceeding a global contrast threshold. Thresholding is used in several commercial optical motion capture systems. Herein optical systems use retro-reflective spherical fiducials illuminated by stroboscopic lighting collocated with the camera lens. Under controlled conditions, this technology enables the images of the fiducials to appear much brighter than the background, especially compared to their appearance under ambient light. A threshold is then used to detect the fiducials having pixel-intensity values above the threshold. Since this thresholding scheme is very straightforward, the detection can be done on the cameras, typically on an FPGA (field-programmable gate array). Hence, only the fiducial centroids and radii have to be processed at a later stage to do motion capture analysis instead of the raw images. Due to this on-camera processing, these systems are typically very fast, operating in real-time.

These optical motion capture systems are, however, sensitive to variant lighting conditions and therefore not highly suitable for outdoors use. It would therefore be desirable to alleviate the strict requirements on the fiducials and illumination thereof. However, this reduces the contrast of the blobs in the image and therefore requires a more sensitive blob detection technique. In particular, simple thresholding cannot be applied as there will be many regions in the image having a similar intensity to the fiducials.

More sophisticated blob detection techniques are known, including template matching, and differential techniques. For example Shortis et al., "A comparison of some techniques for the subpixel location of discrete target images", In Proceedings of the SPIE: Videometrics III, Vol. 2350, 1994, pp 239-250 discloses some of the earlier methods to do automatic target detections for the purposes of photogrammetry, such as thresholding, template matching, match filtering and least square ellipse fitting. The accuracy of the derived centroids is compared.

Template matching and matched filter techniques typically generate and use a set of templates describing the shape to detect and correlate the template with all the pixels in the images. Any general shape can then be detected where the correlation is above a predefined threshold. The template is usually a square image, for example an window of 11-by-11 pixels containing a circular shape. For very specific cases this approach works well, but for noisy shapes robust detection is only possible with a comprehensive set of templates to compensate for shape differences, sensor noise, background variations and so on. Increasing the number of templates increases the computation time significantly. This is a problem. For example Menze et al., "From eigenspots to fisherspots—latent spaces in the nonlinear detection of spot patterns in a highly varying background", (2006) discloses compression of the templates to speed up the matching.

An example of a template matching technique is disclosed in Claus and Fitzgibbon, "Reliable fiducial detection in natural scenes", Proceedings of the 8th European Conference on Computer Vision, Prague, Czech Republic, Vol. 3024, Springer-Verlag, 2004, pp 469-480 for detecting blobs as part of fiducial detection in natural scenes. Template matching is applied, wherein a nearest neighbour classifier is used to determine if a pattern is closer to a blob training example or an arbitrary background example.

There are also known differential blob detection techniques which use second derivatives to detect blobs. A comprehensive survey of techniques that fall into this category can be found in Mikolajczyk and Schmid, "A performance evaluation of local descriptors", IEEE Transactions on Pattern Analysis & Machine Intelligence 27 (10) (2005), pp 1615-1630.

One differential technique is based on the Laplacian of Gaussian, for example as disclosed in Blostein and Ahuja, "A multiscale region detector", Computer Vision, Graphics, and Image Processing 45 (1) (1989), pp 22-41.

Similar techniques are based on the determinant of the Hessian, after computing the gradient of the image, for example as disclosed in Hinz, "Fast and subpixel precise blob detection and attribution", ICIP05, 2005, pp III: 457-460 and in Shneier, "Using pyramids to define local thresholds for blob detection, PAMI 5(3) (1983), pp 345-349. Such techniques mainly try to detect regions where the contrast is high. The detected regions are useful for some applications, but the accuracy of the detected position is generally low and not sufficient for applications such as optical motion capture and photogrammetry. Also, the detected blobs do not necessarily have a predefined shape such as a circle. Accordingly, the techniques may tend to generate false-positive detection where it is desired to detect a fiducial having a certain shape.

A related approach to feature point detection is arc segmentation which describes the process of detecting arcs in images, for example circles in engineering drawings. The edges in images are pivotal to these techniques. A useful literature study of known arc segmentation techniques is contained in Song et al., "Effective multiresolution arc segmentation: Algorithms and performance evaluation", IEEE Transactions on Pattern Analysis and Machine Intelligence 26 (8), 1994.

One type of arc segmentation technique uses the Hough transform to detect circles and lines in images. The Hough transform maps the image into a parameter space for the shape one wishes to detect. The set of parameter values which will cause an intersection of the parametric shape (e.g. line or circle) with an edge pixel are calculated. The process is repeated for each edge pixel, and the parameter values satisfying the edge pixels are thereby accumulated in the parameter space. This accumulation can be weighted according to the strength of the edge. The local maxima of the accumulated values in the parameter space then correspond to the parameters of the shape satisfying most edge pixels. Therefore, shapes can be matched and extracted from the edge pixel image by finding the local maxima in the Hough-transformed parameter space.

Although robust, arc segmentation techniques are generally very computationally expensive and therefore slow. Although the technique works well to detect lines, the degree of computation increases as the parameter space increases. For example, circles require a three-dimensional parameter space and ellipses a five-dimensional space. Furthermore, the parameter space must generally be discrete and bounded in order to compute the transform. Detecting more possible parameter variations requires finer re-sampling and wider bounds on parameter values. Thus in general terms, such arc segmentation techniques are not readily adaptable to blob detection at high speed.

Other feature point detection techniques use colour information present in images. For example, Murch and Chalup, "Combining edge detection and colour segmentation in the four-legged league", Proceedings of the Australian Robotics and Automation Association, 2004 discloses combining edge detection and colour segmentation to detect balls in RGB images. A single ball is found according to the largest blob found with a specific colour. Whilst this can be a useful technique, it is limited to specific applications where an object has a distinctive colour. It is also limited by the colour models of the available cameras. Often colour information is provided at the expense of spatial information, but spatial information is vital to detect small blobs. Also, a global threshold is usually applied to do colour segmentation, so these techniques suffer from the problems with thresholding discussed above.

It would be desirable to develop blob detection techniques which alleviate at least some of these problems.

BRIEF SUMMARY OF THE INVENTION

According to the first aspect of the present invention, there is provided a method of detecting blobs having a predetermined shape in an image, the method comprising:

an analysis stage comprising deriving detection scores, in respect of a plurality of positions in the image, representing the proportion of rays, out of a plurality of rays crossing a closed curve disposed at the respective position and having said predetermined shape, along which the intensity differential across the closed curve exceeds a contrast threshold; and detecting blobs at given positions on the basis of the detection scores.

Further according to the first aspect of the present invention, there is provided an apparatus implementing a similar method.

The first aspect of the present invention exploits a closed curve having a particular predetermined shape. Detection scores are derived representing the proportion of rays crossing the closed curve along which the intensity differential across the closed curve exceeds a contrast threshold. Detection of blobs occurs on the basis of the detection scores, for example by detecting blobs at positions where the detection score exceeds a scoring threshold. Thus, by exploiting the use of the particular shape, the technique allows rapid and accurate detection of blobs.

The technique can provide good performance in detecting blobs having the particular shape. Essentially the detection score D provides a measure of the extent to which there is a blob matching the predetermined shape around its entire periphery, so is highly discriminative of blobs having such a shape. Thus the accuracy is high in the sense of providing a high detection rate and low false positive rate, for example when detecting fiducials having the predetermined shape. However, despite the accuracy, the detection is rapid because the detection scores are computationally inexpensive. This is because the calculations involved just require consideration of a limited number of points on the rays crossing the closed curve of the predetermined shape. Thus it is simple to derive the intensity differentials, for example by taking the difference in intensity between two points along the ray in question. The good performance is achieved effectively because advantage is taken of limiting the detection to the predetermined shape.

Compared to known template matching techniques for blob detection, for example as disclosed in Claus and Fitzgibbon, "Reliable fiducial detection in natural scenes", Proceedings of the 8th European Conference on Computer Vision, Prague, Czech Republic, Vol. 3024, Springer-Verlag, 2004, pp 469-480, the degree of computation required is significantly reduced due to the consideration of intensity differentials along the rays across the closed curve. In contrast to template matching, it is not necessary to calculate the correlation with a large number of templates obtained from a large set of training examples.

Compared to differential techniques, the accuracy of detecting blobs with specific shapes is improved. This is because a search for specific shapes is conducted, rather than just general regions of high second derivatives. The result is a reduced number of false positives.

Similarly, there are advantages as compared to arc segmentation techniques which could in principle be applied to blob detection as blobs have edges. However, they are usually sensitive to noise and slow as they are typically general in approach, evaluating lines in images to determine the degree of circularity. Thus gradients being calculated for all pixels and all the strong edges must be evaluated. In contrast the first aspect of the present invention is more rapid to perform due to the focus on a particular shape in respect of which relatively few operations need to be performed.

These advantages may be realised in a wide range of applications including optical motion capture and photogrammetry. The blobs may be derived from fiducials or markers applied to the object being imaged. The technique provides robust detection without strict requirements on the nature and illumination of the fiducials. Thus the fiducials may be a wide range of types of object providing a blob of the desired shape. For example, in the case of the shape being a circle, the fiducials can be spherical objects such as balls or disc-shaped objects such as round stickers, or even ink-blotches. The fiducials can be applied to any object. Furthermore, there are much lesser constraints on the illumination, as sufficient accuracy is available under normal lighting conditions.

In applications such as optical motion capture the technique is applied to a sequence of images provided at a video frame rate, for example successive frames of a video sequence. In this case, the speed of detection is a significant advantage. The hereinafter described embodiments implement the present invention in a manner allowing the detection to occur in real time and on low-level hardware suitable for use in smart cameras. For example simulations show application of an embodiment of the invention to VGA images (640 by 480 pixels) on a single core PC at a camera rate, that is in approximately 4-50 ms depending on parameter settings and the number of detections. Simulations have shown that the invention may be implemented on hardware, for example to be provided on a camera.

In the first aspect of the present invention, analysis stage may further comprise, before the step of deriving detection scores, determining the size within a range of sizes at which there is a maximum in the differential of the average intensity around a closed curve, disposed at the respective position and having said predetermined shape, with respect to the size of the closed curve. Then, the detection scores may be derived for a closed curve of the determined size.

In this case, the technique allows detection of differently sized blobs within the range of sizes. This could alternatively be achieved by deriving detection scores for plural closed curves at each size within the range. However, compared to that alternative, the degree of computation is reduced by determination of the size at which there is a maximum in the differential of the average intensity around a closed curve with respect to the size of the closed curve. The maximum in the differential indicates the size at which the blob of the predetermined shape is most likely to exist at the position in question. However, the determination of the maximum in the differential requires less computation than separately determining detection scores for closed curves of each size. The maximum in the differential is straightforward to calculate because the calculation may be optimised for the predetermined shape. Effectively this feature increases the speed by limiting the search space of the detection scores.

According to the second aspect of the present invention, there is provided a method of detecting blobs having a predetermined shape in an image, the method comprising:

detecting blobs at given positions in the image;

determining the size within a range of sizes at which there is a maximum in the differential of the average intensity around a closed curve, disposed at the respective position and having said predetermined shape, with respect to the size of the closed curve; and in respect of each detected blob:

deriving a blob-separation threshold which is the average intensity around the closed curve of the determined size;

segmenting pixels of the detected blob on the basis of the blob-separation threshold, and deriving the centroid of the segmented pixels of the detected blob.

Further according to the first aspect of the present invention, there is provided an apparatus implementing a similar method.

The second aspect of the present invention involves determination of the size at which there is a maximum in the differential of the average intensity around a closed curve with respect to the size of the closed curve. The maximum in the differential indicates the size at which the blob of the predetermined shape is most likely to exist at the position in question. Accordingly, this provides an accurate measure of the threshold which separates the blob from the background.

Taking advantage of this, the second aspect of the present invention derives a blob-separation threshold which is the average intensity around the closed curve of the determined size and segments pixels of the detected blob on the basis of the blob-separation threshold. The centroid of the segmented pixels is calculated to derive a measure of the position of the detected blob. Thus a unique threshold is adaptively calculated for each detected blob. Effectively, the threshold takes into account the blob's shape, size, intensity, and local surroundings. This has been demonstrated to provide for computation of robust and subpixel accurate blob centroids when detecting blobs of the predetermined shape, regardless of the nature of the blob and the lighting conditions in which the image was acquired.

The second aspect of the present invention may be applied to particular advantage in combination with the first aspect of the invention. However, the second aspect of the present invention is generally applicable to any technique for detecting blobs.

In both aspects of the present invention, the following features may advantageously be applied.

The analysis stage may further comprise, subsequent to the step of determining the size of a closed curve, deriving the value of said maximum in said differential, in which case the derived value of the maximum in said differential may be used for non-maximum suppression to suppress detection scores generated by the same blob, for example within a group of detection scores in respect of adjacent positions and/or within a group of detection scores in respect of the same position at different scales.

As the maximum in the differential indicates the size at which the blob of the predetermined shape is most likely to exist at the position in question, the value of the maximum is a score which is effective in discriminating between detection scores derived from the same blob, which may be thought of as discrimination between objects of the same class.

The analysis stage may be performed in respect of closed curves at each of a a plurality of different scales to extend the range of sizes of blobs which may be detected.

The analysis stage may comprise initially performing an elimination step comprising deriving an elimination score, in respect of a plurality of positions in the image, representing a measure of the contrast between pixels inside and outside the closed curve having said predetermined shape, further analysis not being performed in respect of any position at which the elimination score exceeds an elimination contrast threshold. By way of example, the elimination score may represent, on the basis of a set of pixel pairs each consisting of a pixel inside and a pixel outside the closed curve having said predetermined shape, the proportion of pixel pairs in the set in which the intensities of the first and second pixels meets a predetermined criterion, for example that the difference in intensity between the two pixels exceeds an elimination threshold.

This feature is may speed up the analysis by eliminating positions where there is a reactively small degree of contrast between pixels inside and outside the closed curve. The nature of elimination score is chosen so that it is easily calculated. The elimination score can be calculated from a smaller number of pixels than used for the detection score. Thus the elimination score provides relatively weak detection of blobs. However, the elimination contrast threshold is chosen to provide a low false negative rate, so that only positions where clearly no blob is present are eliminated and any possible blob is analysed further.

The present invention may be advantageously applied where the predetermined shape is a circle. This is advantageous because the technique is invariant with orientation. Thus circular blobs may be detected regardless of the orientation of the fiducials being imaged. This reduces the degree of computation needed as it is only necessary to consider one set of circular closed curves.

However, the present invention is generally applicable to any other shape, for example ellipses, polygons, such as triangles or squares, or more complicated shapes. In this case, where the fiducials may be imaged in different orientations, which will typically be the case, the technique will need to be applied to plural sets of closed curves in different orientations. This will increase the degree of computation required.

Embodiments of the present invention will now be described by way of non-limitative example with reference to the accompanying drawings.

BRIEF DESCRIPTION OF THE DRAWINGS

FIG. 1 is a flow chart of a blob detection method;
FIG. 2 is a flow chart of an elimination step.

DETAILED DESCRIPTION OF THE INVENTION

Figure 3:
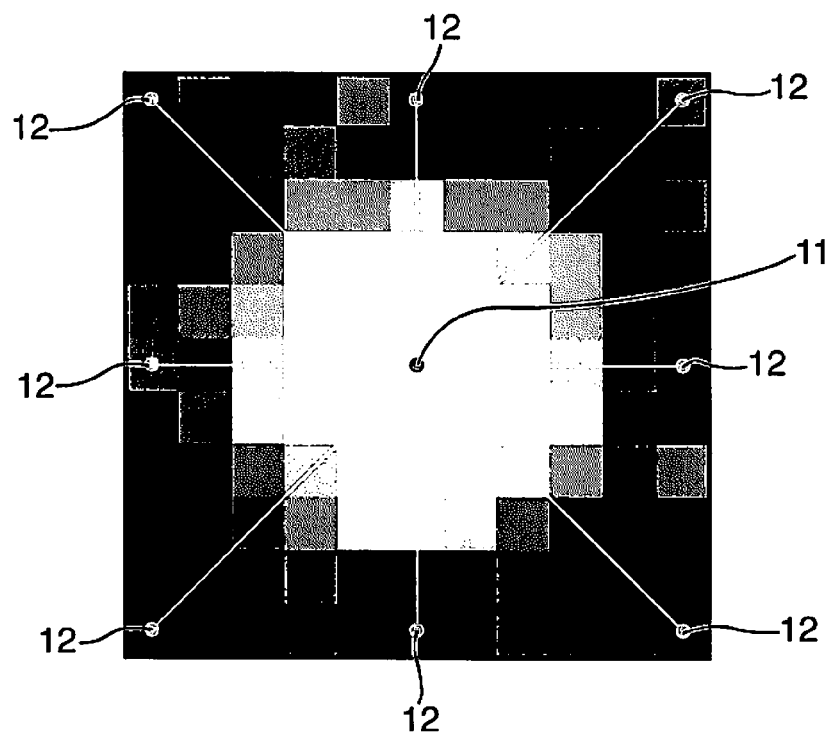
FIG. 3 is an image of a window illustrating the position of pixel pairs employed in the elimination step.

A blob detection method is shown in the flow chart of FIG. 1.

The method operates on an image 1. The image 1 is two dimensional and consists of an array of values in respect of individual pixels of the image 1. In practical embodiments, the method may be performed repeatedly on a sequence of images 1 provided at a video frame rate, typically successive frames of a video image. In the following, it is assumed that the values of the image 1 have an 8 bit gray-scale representation, although the method is readily extendible to arbitrary precision formats. The values represent intensity and may be derived from a colour representation using conventional processing.

The image 1 is supplied to a plurality of analysis stages 2 which perform the same analysis of the image 1 but at a different scale. Each analysis stage 2 is therefore identical and consists of the same steps, although for clarity the steps of only one analysis stage are set out in FIG. 1. As an alternative to implementing the analysis stages 2 in parallel as shown in FIG. 1, the analysis stages 2 could be implemented in series by successively scaling up the image 1. Any number of analysis stages 2 may be employed.

The use of plural analysis stages 2 allows detection of blobs at different scales. However each analysis stage 2 itself allows detection of blobs across a range of sizes, so a single analysis stage 2 could be employed instead. However the benefit of plural analysis stages 2 is to reduce the computational expense, because with a single analysis stage 2 would require a larger window of the image 1 to be considered.

Each analysis stage 2 consists of the following steps.

In step S1, the image 1 is decimated, as necessary to scale the image 1 to the appropriate scale of the analysis stage 2 concerned. In this embodiment, at the lowest decimation level (level 0) there is no decimation and at each successive decimation level, the image size is reduced by a factor of 2. Thus, the decimation level n determines the size of the blobs that will be detected on that level, where $n \in \{0, 1, \ldots, L\}$. For example, if there are three decimation levels, then for a typical VGA image, the detection of the following blob sizes will be performed on each level:

Level 0: 640×480 image, 4-8 pixel diameter blobs.
Level 1: 320×240 image, 8-16 pixel diameter blobs.
Level 2: 160×120 image, 16-32 pixel diameter blobs In step S1, the image 1 is also low-pass filtered to reduce the effect of high frequency components after decimation. This smoothes the image 1 slightly and removes some noise (such as very small bright spots situated in noisy backgrounds). The filtering is typically applied before decimation. The low-pass filter is usually a Gaussian or Uniform filter, for example a 3×3 Gaussian filter One common approach which may be applied in step S1 is to filter the image 1 and then to decimate simply by selecting every other pixel (in the horizontal and vertical direction) to reduce the image size by factor 2 in each dimension.

Another approach which may be applied in step S1 is averaging, for example by replacing every other 2×2 window with the average intensity of the pixels in the window, or by employing some other averaging kernel. Such an approach combines the decimation and low-pass filtering step. This approach is chosen for ease of implementation.

The remainder of the analysis stage 2 is performed by sliding an M×N window over the decimated image 1 and performing steps S3 to S5 on the pixels within the window at each position. M and N are integers and in one implementation both equal 11. The pixels within the window at the next position are selected in step S2, then steps S3 to S5 are performed on the selected pixels. In step S6, the analysis stage 2 returns to step S2 if there remain any unused window positions.

Steps S3 to S5 effectively perform detection of blobs located at the position of the window, being the central point of the window. The window is moved, one pixel at a time, across every possible position in the decimated image 1. This corresponds to performing blob detection at every pixel in the decimated image 1 (assuming M and N are odd, or else the position is intermediate pixels), except for positions around the edge where the window would otherwise extend beyond the decimated image 1. At decimation level n, due to reduction of the width and height by a factor of two at each successive level, the pixels have a vertical and horizontal separation of (n+1) pixels of the original image.

Step S3 is an elimination step in which a fast majority-voting scheme is employed to eliminate low-contrast regions. In particular, step S3 is shown in FIG. 2 and comprises step S31 of calculating an elimination score E and step S32 of deciding whether to eliminate the window on the basis of the elimination score E.

The elimination score E calculated in step S31 identifies low-contrast shapes and shapes which may be eliminated because they are unlikely to fit the blob profile. The elimination score E for the window represents, on the basis of a simple probing method, a measure of the contrast between pixels towards the centre and towards the edges of the window, and thus inside and outside closed curves used in steps S4 and S5 below. In particular the elimination score E makes reference to a set of pixel pairs. Each pixel pair is chosen so that one of the pixels coincides with the inside/foreground and the other with the outside/background. For example, one pixel may be at the centre of the window (and hence inside the closed curves) and the other pixel may be at the edge of the window (and hence outside the closed curve). In each pixel pair, it is determined whether the intensities of the pixels meet a predetermined criterion. The elimination score E is calculated as the number of pixel pairs meeting the criterion.

A simple criterion employed below is whether the difference in intensities exceeds an elimination threshold $T_{contrast1}$. In this case, the elimination score E is represented by the equations:

$$E = 100 \frac{1}{N} \sum_{i=1}^{N} \zeta(i) \quad (1)$$

and $$\zeta(i) = \begin{cases} 1 & \text{for } \delta \geq T_{constrast1} \\ 0 & \text{for } \delta < T_{contrast1} \end{cases} \quad (2)$$

where $\delta = I(x_{in}(i), y_{in}(i)) - I(x_{out}(i), y_{out}(i))$, $(x_{in}(i), y_{in}(i))$ is the xy-coordinate of the foreground pixel, $(x_{out}(i), y_{out}(i))$ is the xy-coordinate of the background pixel, and N is the number of pixel pairs.

Comparison of the difference with elimination threshold $T_{contrast1}$ has the advantage being computationally simple. Other criteria based on the intensities of the pixels may be applied, perhaps providing greater discriminatory power but at the expense of additional computation.

In step S32, it is decided whether to eliminate the window on the basis of the elimination score E. In particular, the window is eliminated unless the elimination score E exceeds an elimination contrast threshold $T_{majority1}$. When the elimination score E is calculated using equation (1), the elimination contrast threshold $T_{majority1}$ has a value from 0 to 100. If the window is eliminated then the analysis stage 2 returns to step S2 so that steps S4 to S5 forming the remainder of the analysis stage are not performed in respect of the window in question.

The elimination score E provides relatively weak detection of blobs. The purpose of step S3 is to increase the speed of the analysis stage 2 by eliminating ill-fitting shapes in the window and passing possible blob shapes in the window on to steps S4 and S5 for further examination. When there is a low contrast between the foreground and background the elimination score E is low and the window is eliminated on the basis that it is unlikely to contain a blob, and vice versa. This speeds up the analysis. The nature of elimination score E is means it is easily calculated, from a smaller number of pixels than used in stages S4 and S5.

FIG. 3 shows an example of eight specific pixel pairs within a window containing a blob. Each pixel pair includes the same pixel 11 at the centre of the window with coordinates $(x_{in}(i), y_{in}(i)) = (x, y)$. Each pixel pair also includes one of the eight pixels 12 at the edge of the window with coordinates $(x_{out}(i), y_{out}(i)) \in \{(x-5, y-5), (x-5, y), (x-5, y+5), (x, y-5), (x+5, y+5), (x+5, y), (x+5, y+5), (x, y+5)\}$ In the example of FIG. 3, the window is not eliminated has the high degree of contrast within each pixel pair results in a high elimination score E.

The elimination contrast threshold $T_{majority1}$ is chosen to provide a low false negative rate, so that only positions where clearly no blob is present are eliminated and any possible blob is analysed further. In general, the elimination contrast threshold $T_{majority1}$ and elimination threshold $T_{contrast1}$ are variable input parameters. The values $T_{contrast1} = 20$ and $T_{majority1} = 80$ produced good results for a particular training set, as these values increased the overall speed of the method significantly, whilst not prohibiting the detection of true positives. It should be noted that step S3 implies a constraint on the blob placement, in that it prohibits the detection of small blobs within close proximity.

Steps S4 and S5 make reference to a set of closed curves within the window. The closed curves each have the same predetermined shape. As will become apparent, steps S4 and S5 provide for detection of blobs having the predetermined shape. By focussing on a particular shape, the method provides for accurate detection of the blobs with a computationally inexpensive calculation.

Figure 4:
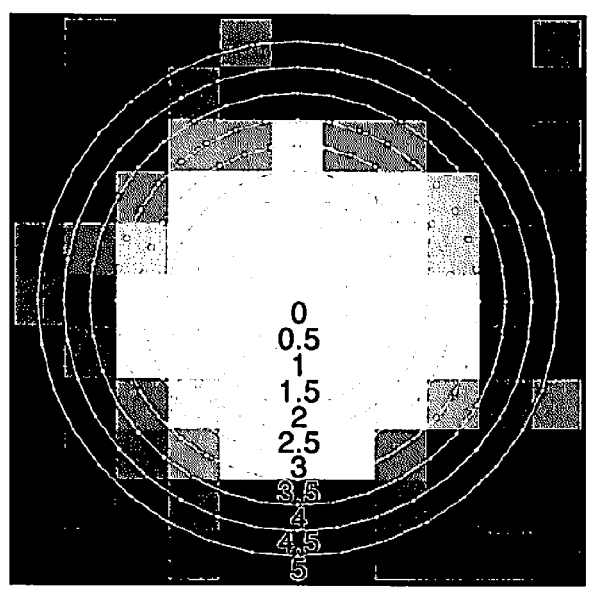
FIG. 4 is an image of a window containing a blob and illustrating the position of circles used in the blob detection method.

In this example, the closed curves are circles. Each of the circles has a different size, that is a different radius. FIG. 4 shows an example of a set of 10 circles having radii from 0.5 to 5 (measured in pixels) within a window containing a blob, being a circular blob with some Gaussian noise added.

However, in general the method could be applied to any other predetermined shape, for example an ellipse, polygon such as a triangle or square, or a more complicated shape. The advantage of a circle is that it has no orientation which reduces the degree of computation, as the orientation of the object being imaged is irrelevant. If the shape can appear in different orientations, then the method will need to be applied to plural sets of closed curves in different orientations.

In step S4, calculations are made on the basis of the closed curves to derive the size of the closed curve at which there is a maximum in the differential of the average intensity around the closed curve with respect to the size. This will now be illustrated for the case that the predetermined shape of the closed curves is a circle, as shown in FIG. 4.

The closed curves are 2D circles, where circle j of radius $r_j$ has $N_j$ angular samples. Sample i on circle j is expressed as the polar coordinate $(r_j, \theta_i)$, and the center of each circle coincides with the centre of the window (x,y). The average pixel intensity averaged over varying $\theta$ for a fixed radius give the intensity profile (average intensity around the closed curve) of the shape which is a function of the radius $r_j$. Mathematically, the intensity profile for radius $r_j$ is described by the following equation:

$$\overline{I(r_j)} = \frac{1}{N_j} \sum_{i=1}^{N_j} I(r_j, \theta_i), \quad (3)$$

where $r_j \in \{0, 0.5, \ldots, 5\}$ and $j \in \{1, \ldots, 11\}$ in the present example. $N_j$ is different for each j, due to the different number of pixel pairs for different radii.

Bilinear interpolation may be employed to calculate $\overline{I(r_j)}$ accurately. Bilinear interpolation is basically the extension of linear interpolation for interpolating functions of two variables on a regular grid. Hence, to calculate the intensity of a sample that does not necessarily fall on the grid (as is the case for points around the circles), the intensities of the four nearest pixels on the grid are used to calculate the intensity at the sample. If the kth pixel nearest to $(r_j, \theta_i) = (x_{ij}, y_{ij})$ is represented by the integer xy-coordinate $(x_{kij}, y_{kij})$, $I(r_j, \theta_i)$ can be expressed as:

$$I(r_j, \theta_i) = \sum_{k=1}^{4} \alpha_{kij} I(x_{kij}, y_{kij}), \quad (4)$$

where $\alpha_{kij} \in (0,1)$, $$\sum_{k=1}^{4} \alpha_{kij} = 1,$$

and for an 11×11 window.

Figure 5:
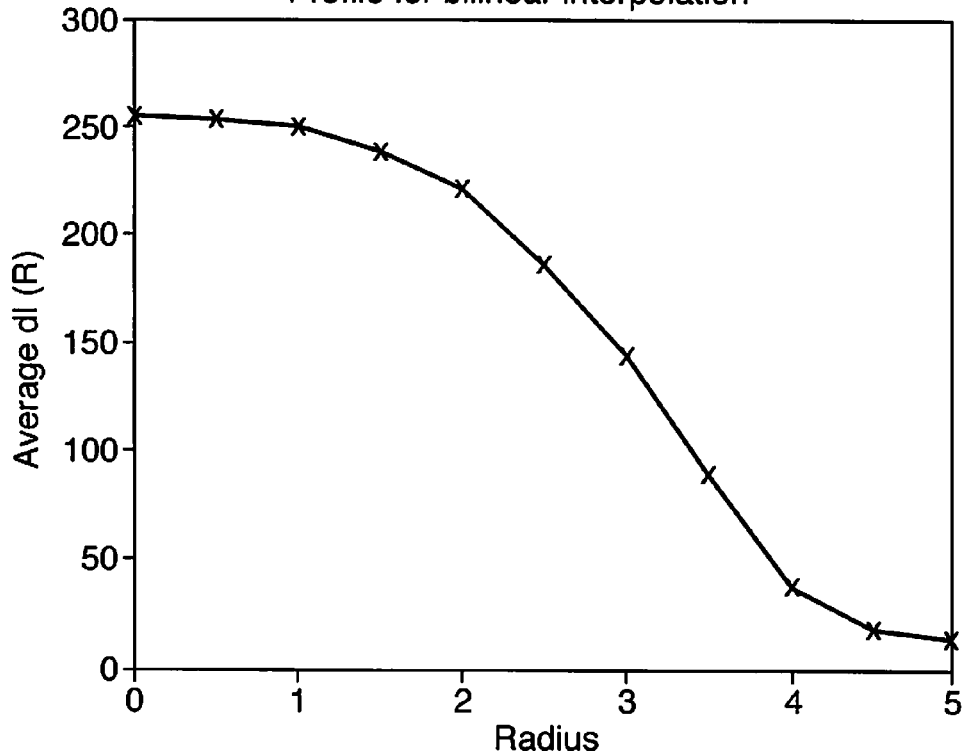
FIG. 5 is graph of the average intensity around the circle against the radius of the circle.

By way of example, FIG. 5 is a graph of the average intensity around the closed curve against radius $r_j$ for the specific blob shown in FIG. 4. The figures were calculated for the case that $N_j=36$ $\forall j$ so that $\theta_i \in \{0, 10, \ldots, 350\}$.

Step S4 comprises deriving the maximum in differential of the intensity profile (average intensity around the closed curve) with respect to radius (size). From equation (3), the differential can be represented by the equation:

$$\overline{d(I(r_j))} = \frac{1}{N_j} \sum_{i=1}^{N_j} \frac{I(r_{j-1}, \theta_i)) - I(r_{j+1}, \theta_i)}{r_{j+1} - r_{j-1}}, \quad (5)$$

where $j=[2,3, \ldots, 9,10]$ corresponding to $r_j=[0.5,1, \ldots, 4.5]$, and it is assumed that the blob is light on a dark background.

If $r_{j+1} - r_{j-1} = c$ for all j, and all circles have the same number of samples, equation (5) can be reduced to $$\overline{d(I(r_j))} = \frac{1}{c}(\overline{I(r_{j-1})} - \overline{I(r_{j+1})}) \quad (6)$$

Accordingly step S4 is performed by deriving the differential at each radius $r_j$ across the range of radii (sizes) of the circles in the set, and then selecting the radius $r_{max}$ at which the differential is maximum, ie $r_{max} = \text{argmax}(\overline{d(I(r_j))})$. This is useful because it is presumably also the size of the closed curve where the intensity separation between the foreground and background is a maximum.

For use later in the method, there are also calculated two values at the radius $r_{max}$ at which the differential is maximum.

One value is the value S of the maximum differential, ie $S = \overline{d(I(r_{max}))}$, where $S \in (-255,255)$. This is used to perform non-maximum suppression to suppress detections expected to have been generated by the same blob. The value S is effective for non-maximum suppression because it indicates the degree of intensity separation between the foreground and background where that intensity separation is a maximum. In fact the value S provides some discrimination of blobs as it generally increases in the present of a blob. However, it is too sensitive to noise for accurate detection. Outliers typically skew the average in general statistical calculations and therefore increase the sensitivity to noise. Accordingly a different score is used for blob detection as will be described below.

The other value is the average intensity T around the closed curve having the radius $r_{max}$ at which the differential is maximum, ie $T = \overline{I(r_{max})}$, where $T \in (0,255)$. As will be later described this is used as a blob-separation threshold T to separate a blob from the background. This accurately sets a threshold which is adaptive, because the radius $r_{max}$ at which the differential is maximum is the size where the intensity separation is a maximum.

Figure 6:
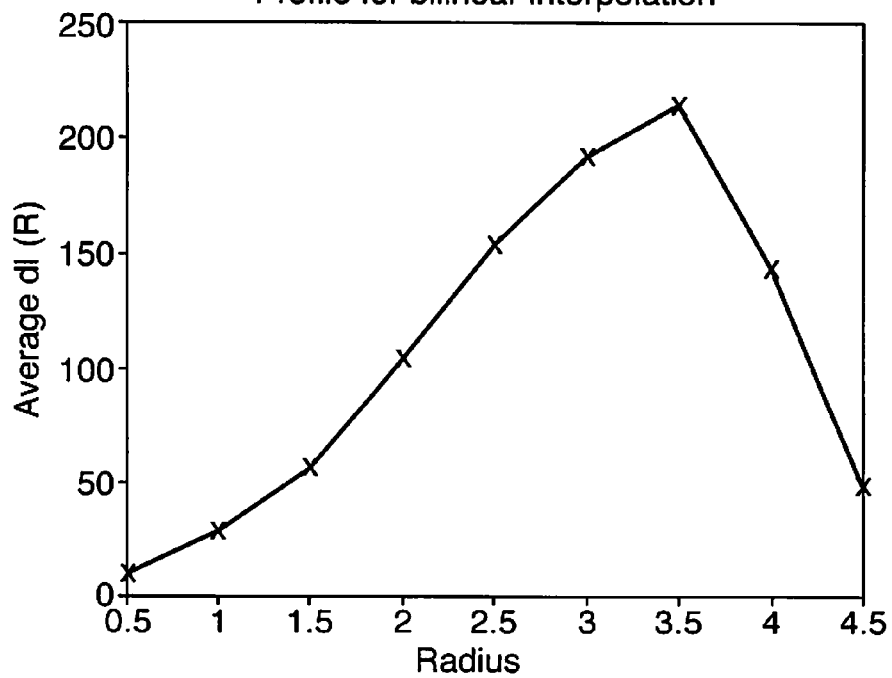
FIG. 6 is a graph of the differential of the of the average intensity around the circle against the radius of the circle.

By way of example, FIG. 6 is a graph of this differential for the specific blob shown in FIG. 4, being the gradient of the graph of FIG. 5. As can be seen, the radius $r_{max}$ at which the differential is maximum has a value of 3.5. In this case, the value S has a value of 214.65 and the blob-separation threshold T has a value of 90.

The following comments are made on the practical implementation of step S4.

For fast implementation, all the bilinear interpolation coefficients can be precomputed. One can also pre-add the appropriate coefficients together before calculating $\overline{I(r_j)}$. That is, the coefficients for radius $r_j$ can also be represented as an 11×11 matrix $W_{r_j}$, so that equation (3) can be reduced to:

$$\overline{I(r_j)} = \frac{1}{N_j} \sum_{m=1}^{11} \sum_{n=1}^{11} W_{r_j}(m,n) \cdot I(m,n). \quad (7)$$

Note from equation (7) that one can precompute the non-zero entries in w and iterate only over them. For example, the bilinear coefficients for $r_j=2$ and $N_j=36$ are:

$$W_2 = \begin{bmatrix} 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0.3039 & 1.9520 & 2.8214 & 1.9520 & 0.3039 & 0 & 0 & 0 \\ 0 & 0 & 0 & 1.9520 & 1.8547 & 0.1159 & 1.8547 & 1.9520 & 0 & 0 & 0 \\ 0 & 0 & 0 & 2.8214 & 0.1159 & 0 & 0.1159 & 2.8214 & 0 & 0 & 0 \\ 0 & 0 & 0 & 1.9520 & 1.8547 & 0.1159 & 1.8547 & 1.9520 & 0 & 0 & 0 \\ 0 & 0 & 0 & 0.3039 & 1.9520 & 2.8214 & 1.9520 & 0.3039 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \end{bmatrix}.$$

Hence, one only has to iterate over m, $n \in \{4,5,6,7,8\}$. Note the scarcity of $W_2$ and that at least 3 repetitions occur for each non-zero entry in $W_2$, due to the inherent symmetry of the circular kernel. One can therefore factor all the common coefficients out to reduce implementation cost even further.

Where the number of multipliers is limited, for example in an implementation on an FPGA (for smart cameras or other applications), step S4 may employ a nearest neighbour solution, as follows.

Figure 7:
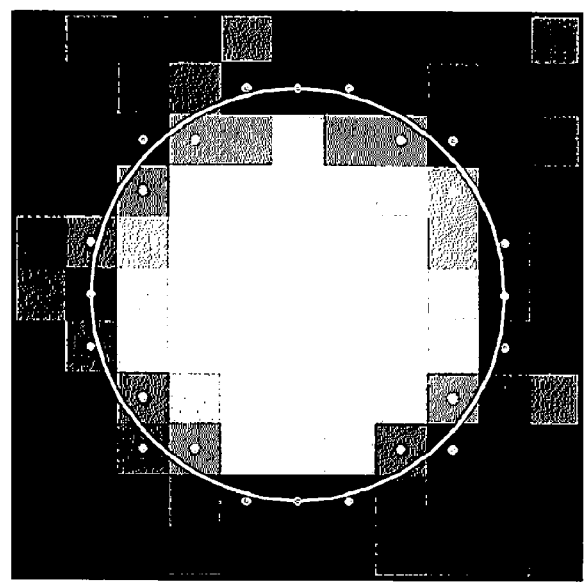
FIG. 7 is an image of the window containing a blob shown in FIG. 4 overlaid with one of the circles.

Let $(r_j, \theta_i)$ map to the Cartesian coordinate $(x_{ij}, y_{ij})$. Subsequently, the nearest integer coordinate to $(x_{ij}, y_{ij})$ is calculated so that $(x_{ij}, y_{ij}) \approx (\hat{x}_{ij}, \hat{y}_{ij})$ and $I(\hat{x}_{ij}, \hat{y}_{ij}) \approx (r_j, \theta_i)$. By way of example, FIG. 7 shows the image of FIG. 4 with the circle of radius r=4, and also identifies the nearest neighbour pixels. To reduce the number of computations even more, all the overlapping coordinates are removed after integerising so that $N_j$ will be different at each radius. Due to the approximation of $I(r_j, \theta_i)$, sample $(\hat{x}_{ij}, \hat{y}_{ij})$ does not fall on the correct circle any more, introducing a severe bias in our computations. Compensation for this bias may be achieved as follows.

Firstly, an estimate is made of the new circle on which the approximated integerised points fall. The average radius $r_{jnn} = \overline{r_j}$ is computed, where $$\overline{r_j} = \frac{1}{N_j} \sum_{i=1}^{N_j} \sqrt{\hat{x}_j(i)^2 + \hat{y}_j(i)^2}, \quad (8)$$

so that the nearest-neighbours intensity profile $I_{nn}$ can be expressed as $$\overline{I_{nn}(r_{jnn})} = \frac{1}{N_j}\sum_{i \ne 1}^{N_j} I(\hat{x}_j(i), \hat{y}_j(i)). \qquad (9)$$

The coordinates of all pixel-pairs may be precomputed to enhance implementation efficiency.

Figure 8:
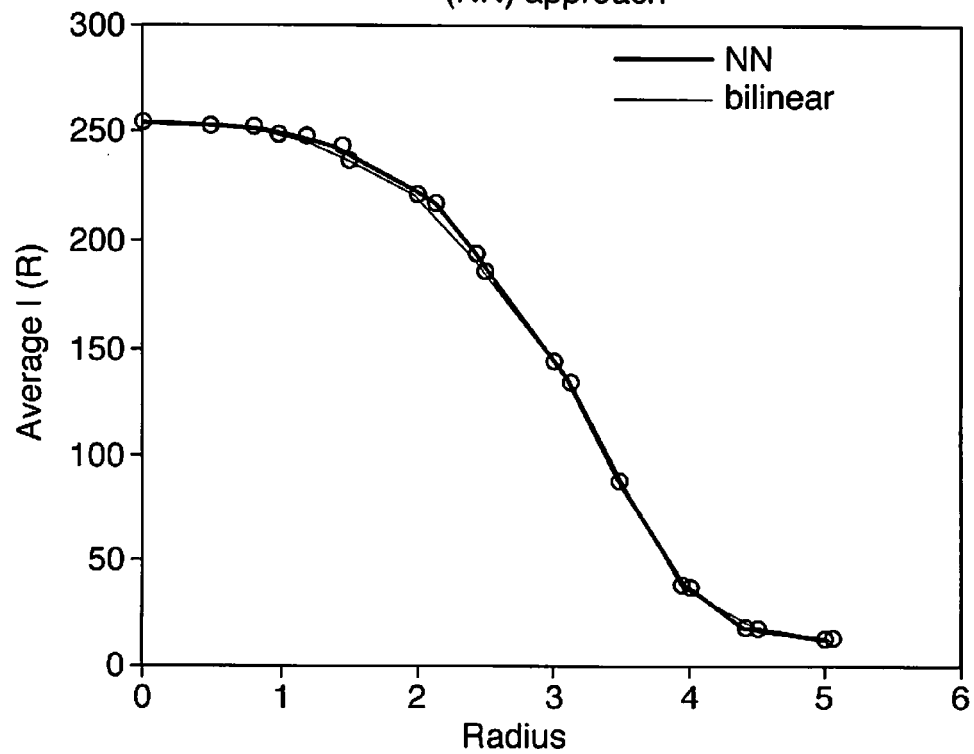
FIG. 8 is the graph of FIG. 5 showing curves for bilinear interpolation and nearest neighbour implementations.
Figure 9:
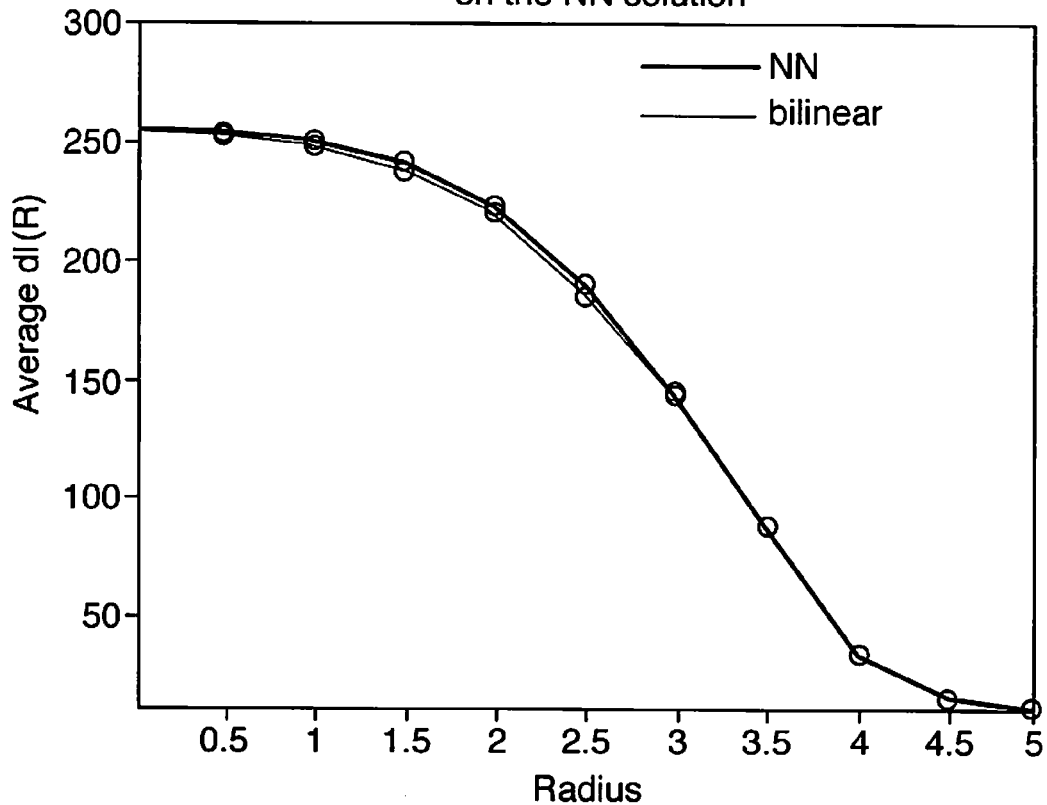
FIG. 9 is a graph corresponding to that of FIG. 8 after performing linear interpolation on nearest neighbour results.

FIG. 8 shows the nearest neighbour solution overlaid on the graph of FIG. 5. One can note from the samples that $r_{jnn} \ne r_j$ so that $r_{j+1nn} - r_{j-1nn} \ne c$. Hence, there is not a common denominator anymore so that equation (6) cannot be applied without introducing a multiplier at each sample. To be able to apply equation (6) as before, linear interpolation is used to calculate $\overline{I_{nn}(r_j)}$ for $r_j = [0.5, \ldots, 5]$. Hence, $$\overline{I_{nn}(r_j)} = \alpha \overline{I(r_{ann})} + \beta \overline{I(r_{bnn})}, \qquad (10)$$

where $r_j = [0.5, 1, \ldots, 5]$, $r_{ann}$ and $r_{bnn}$ are the two nearest radii encompassing $r_j$ on a straight line, $j=[2, \ldots, 11]$, $a, b \in \{1, 2, \ldots 11\}$, $I_{nn}(r_1) = I(r_{(j=1)nn})$ and $\alpha + \beta = 1$. Equation (6) and the rest of step S4 are then applied as before. Linear interpolation therefore introduces only 20 multipliers (two for each of ten radii), without a significant performance degradation compared to the bilinear solution. FIG. 9 shows the graph of FIG. 8 after such linear interpolation.

Figure 10:
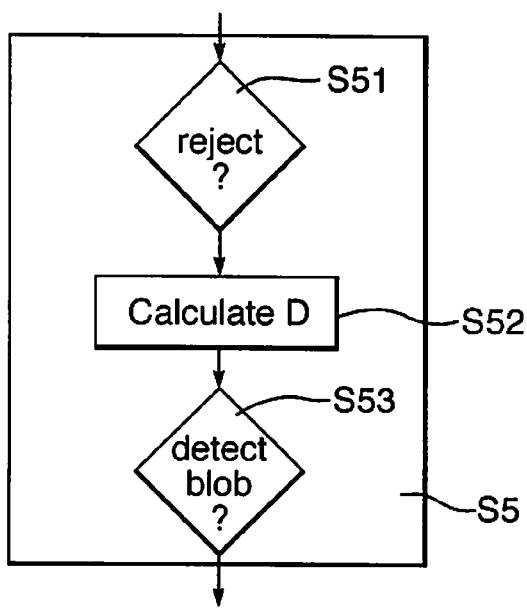
FIG. 10 is flow chart of a detection step.

Step S5 is a detection step in which a detection score is employed to detect blobs having the predetermined shape of the closed curves. In particular, step S5 is shown in FIG. 10 and comprises step S51 of rejecting the window unless the blob is in a certain range, step S52 of calculating a detection score D, and step S53 of deciding whether to eliminate the window on the basis of the detection score D.

Step S5 is based on a consideration of the closed curve having the radius $r_{max}$ (size) at which the differential is maximum, as determined in step S4. As this radius $r_{max}$ is the size of the closed curve where the intensity separation between the foreground and background is a maximum, this is the size at which it is best to test for the presence of a blob. It can be readily assumed that all pixels along a closed curve of radius $r_{max}+1$ are part of the background and all pixels along a closed curve of radius $r_{max}-1$ are part of the blob, if present.

In step S51, the window is rejected if the radius $r_{max}$ (size) at which the differential is maximum is outside the range from 2 to 4 pixels. This merely prevents overlap for the sizes considered by the analysis stages 2 in respect of different scales. If the window is rejected, the method proceeds immediately to step S6.

The detection score D calculated in step S52 is based on a consideration of rays crossing the closed curve having the radius $r_{max}$ (size) at which the differential is maximum. A plurality of rays crossing this closed curve are considered. Ideally the rays are perpendicular to the curve, but in some solutions the rays may effectively be inclined to the perpendicular. Along each ray, there is considered the intensity differential across the closed curve, for example the difference in intensity between two points along ray. This intensity differential is calculated for each ray and compared to a contrast threshold $T_{contrast2}$. The detection score D is calculated to represent the proportion of rays for which the intensity differential exceeds the contrast threshold $T_{contrast2}$.

Figure 11:
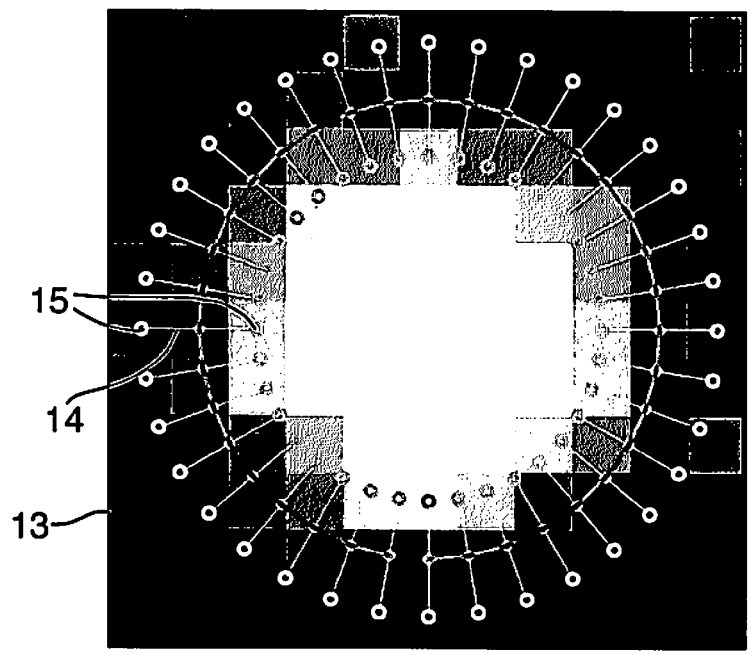
FIG. 11 is the image of FIG. 7 additionally showing rays and points considered in the detection step.

By way of example FIG. 11 shows, in respect of the blob shown in FIGS. 4 and 7, the rays 14 crossing the closed curve 13 at which the differential is maximum, as well as the points 15 along each ray, $\forall N_j = 36$, and $r_j = 4$.

In this case, the detection score D is represented by the equations:

$$D = 100 \frac{1}{N} \sum_{i=1}^{N} \zeta(i) \qquad (11)$$

and $$\zeta(i) = \begin{cases} 1 & \text{for } \delta \ge T_{constrast2} \\ 0 & \text{for } \delta < T_{contrast2} \end{cases} \qquad (12)$$

where N is the number of rays and $\delta = I(r-1, \theta_i) - I(r+1, \theta_i)$.

In step S53, it is decided whether to the window contains a blob on the basis of the detection score D. In particular, a blob is detected if detection score D exceeds a scoring threshold $T_{majority2}$. When the elimination score E is calculated using equation (11), the scoring threshold $T_{majority2}$ has a value from 0 to 100. On detecting a blob, there is stored data representing this fact and information about the blob, namely the position (x,y) of the window, the detection score D, the radius $r_{max}$ at which the differential is maximum, the value S of the maximum differential and the average intensity T around the closed curve having the radius $r_{max}$ at which the differential is maximum.

The scoring threshold $T_{majority2}$ is chosen to provide a low false positive rate. Typically the scoring threshold $T_{majority2}$ has a high value, for example at least 90% or at least 95%.

The detection in step S5 provides good performance in detecting blobs having the particular shape, in this case a circle. That is the accuracy is high in the sense of providing a high detection rate and low false positive rate, for example when detecting fiducials having the predetermined shape. The good speed and performance are achieved because of the way in which the detection score D is based on the closed curves having the predetermined shape. Essentially the detection score D provides a measure of the extent to which there is a blob matching the predetermined shape around its entire periphery. The detection will achieve most accuracy when detecting high contrast blobs on non-busy backgrounds, but will also have high accuracies for low-contrast blobs on non-busy backgrounds or high-contrast blobs on busy backgrounds.

However, despite the accuracy, the calculations involved are computationally inexpensive, because they just require consideration of the points 15 on the rays 14 crossing the closed curve 13 of the predetermined shape. This advantage is taken of limiting the detection to that shape.

The following comments are made on the practical implementation of step S52.

Similar to step S4, it is possible to achieve most accurate results by implementing the calculation of the detection score D using bilinear interpolation, but in implementations where the number of multipliers is practically limited, for example on an FGPA, the implementation may use a nearest neighbour technique, which will now be discussed.

Firstly, all the samples on the radius $r-1$ and $r+1$ are approximated by following the same integerising procedure as in step S4. Taking j as the index of radius r, so that a foreground pixel is given by $(\hat{x}_{(j-2)i}, \hat{y}_{(j-2)i})$ and a background pixel is given by $(\hat{x}_{(j+2)i}, \hat{y}_{(j+2)i})$, the number of possible pixel pairs are then reduced by keeping only the unique pairs from all $(\hat{x}_{(j-2)i}, \hat{y}_{(j-2)i})$ and $(\hat{x}_{(j+2)i}, \hat{y}_{(j+2)i})$. The coordinates of all pixel-pairs may be precomputed to enhance implementation efficiency.

Figure 12:
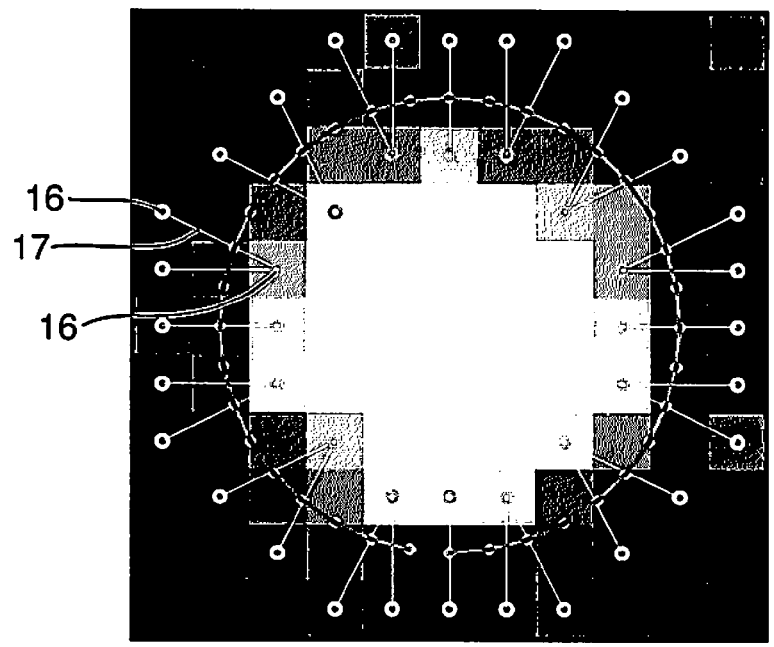
FIG. 12 is the image of FIG. 7 additionally showing rays and points considered in the detection step when employing a nearest neighbour technique.

By way of example FIG. 12 shows, in respect of the blob shown in FIGS. 4 and 7, the points 16 which are used with the nearest neighbour technique, ∀ $N_j$=36, and $r_j$=4. In this case, the points 16 are effectively arranged along rays 17 which cross the closed curve 13 but at angles which are not quite perpendicular to the closed curve 13.

The external parameters (those exposed to the user) of the algorithm are summarized as follows:

| Parameter | Description | Default |
|---|---|---|
| $r_{max}$ | Maximum radius of a valid blob, measured in pixels ($r_{max} \leq 16$.) | 16 |
| $r_{max}$ | Minimum radius of a valid blob, measured in pixels ($r_{min} \geq 2$.) | 2 |
| $T_{contrast1}$ | Elimination contrast threshold, $T_{contrast1} \in \{0, 1, \ldots, 255\}$ for step S3 | 20 |
| $T_{majority1}$ | Elimination threshold, $T_{majority1} \in (0, 100)$ for step S3 | 80 |
| $T_{contrast2}$ | Intensity difference between foreground and background, $T_{contrast2} \in \{0, 1, \ldots, 255\}$ for Stage 2. | 20 |
| $T_{majority2}$ | Majority threshold, $T_{majority2} \in (0, 100)$ for Stage 2. | 98 |

In step S7, the results of all the detected blobs from each analysis stage 2 are subject to non-maximum suppression. Multiple hits for the same blob can occur, for example in the same analysis stage 2 (ie at the same decimation level) for adjacent positions, and/or in different analysis stages 2 (ie at different decimation levels) for the same position. For example, if a blob with a 4 pixel radius is rather elliptical, it can, e.g., be detected at multiple nearby pixels on level 0 (all representing the centroid of the blob) with a radius in the vicinity of 3.5. It can also be detected at some corresponding nearby coordinates on level 1 as having a radius in the vicinity of 4.5. Therefore, the same blob can be detected multiple times.

Accordingly, non-maximum suppression is performed in respect of detections which are obtained in the same analysis stage 2 for adjacent positions, or are obtained in different analysis stages 2 for the same position. The non-maximum suppression is performed on the basis of the value S of the maximum differential. Detections for which the value S of the maximum differential is not a maximum are suppressed. The value S of the maximum differential is an effective discriminator for the reasons mentioned above For example on decimation level n, the coordinate with the maximum score in a 5×5 neighborhood is identified. Its score is then compared with the local maximum of corresponding regions from level n−1 and level n+1. The coordinate with the maximum score in the same 5×5 region from levels n, n−1 and n+1 is then chosen as the hit associated with the blob. It should be noted that a 5×5 region on level n maps to a 10×10 region on level n−1 and a 2.5×2.5 region on level n+1 which is approximated by a 3×3 region.

Non-maximum suppression is a well-known technique to choose a local maximum from M×N sized regions in images. It may be implemented using any existing procedures, for example as disclosed in Neubeck & Van Gool, "Efficient non-maximum suppression", 2006, pp. III: 850-855. It should be noted that the present non-maximum suppression scheme assumes that a blob detection can typically overlap on only two adjacent decimation levels. Hence, it can happen that a blob at level 0 can coincide with a big blob at level 3 or higher, as the smaller blob will then only appear as a very small spot on level 3 or higher.

Figure 13:
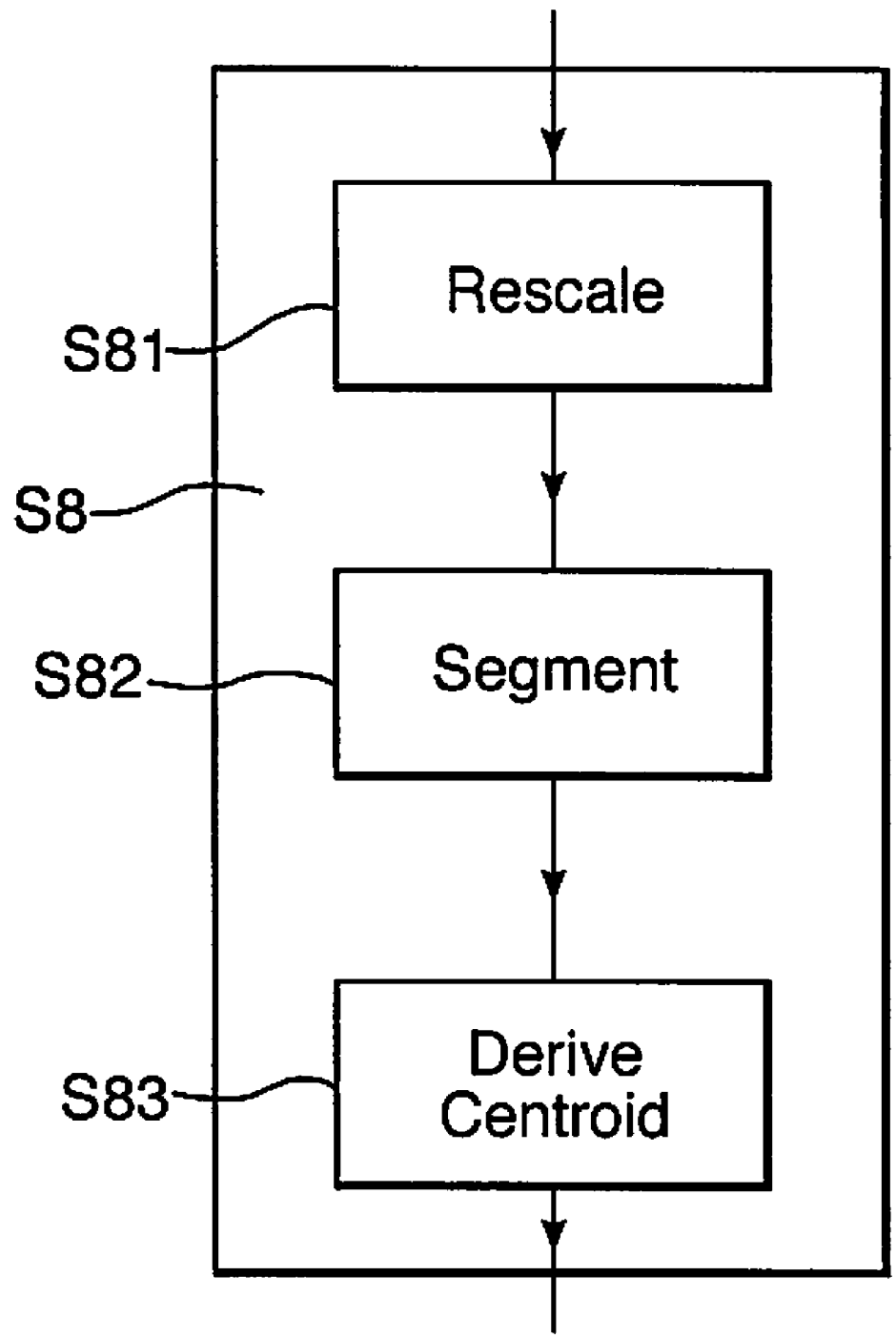
FIG. 13 is flow chart of a non-maximum suppression step.

In step S8 the centroid of the blob is calculated. All the hits that survived the non-maximum suppression are evaluated. In particular, step S8 is shown in FIG. 13 and comprises step S81 of rescaling the blobs, step S82 of segmenting the pixels of the blob and step S83 of deriving the centroid of the segmented pixels.

In step S81, the positions (x,y) and radii of the detected blobs are re-scaled to their correct sizes to take account of the decimation performed in the analysis stages 2. Hence, (x,y,r) of each blob is mapped to its corresponding decimation level 0 coordinate $(x_0, y_0, r_0) = (2^n x + x_k, 2^n y + y_k, 2^n r)$, where $(x_k, y_k)$ compensates for any possible offset. For example, where the average-decimation scheme uses 4 pixels in a 2×2 window from level n−1 to compute the decimated value, if a blob-detection coordinate is converted back to level 0, it is opted to map the decimated coordinate to the middle of the block on level n that was used to compute its decimated value. Hence, in our case, $x_k = y_k = 2^{n-1} - 0.5$ for n>0. Hence the coordinate (0,0) on levels 0,1,2 and 3 will map to the coordinates (0,0), (0.5,0.5), (1.5,1.5) and (3.5,3.5) on level 0.

Generally, $(x_0, y_0)$ is not accurate enough for our purposes due for example to a noisy gradient (from which the radius is calculated), elliptical data and information loss due to decimation. Hence, it is necessary to refine the centroid $(x_0, y_0)$ to subpixel accuracy, while taking the above factors into account. This is critical for applications requiring accuracy such as optical motion capture and photogrammetry.

In step S52, the pixels of the blob are segmented using the average intensity T around the closed curve having the radius $r_{max}$ at which the differential is maximum. As previously mentioned this accurately sets a threshold which is adaptive, because the radius $r_{max}$ at which the differential is maximum is the size where the intensity separation is a maximum.

Any suitable segmentation technique may be applied. One example using the radius $r_{max}$ is to segment all the pixels with intensities greater than T in a vicinity smaller than $2^n(r_{max} + 1.5)$ from the position $(x_0, y_0)$ of the blob are selected. This may be restricted to pixels connected to the position $(x_0, y_0)$.

In step S53, the segmented pixels are then used to calculate a more accurate centroid $c = (c_x, c_y)$. The blob now consists of P connected pixels, with positions $p_{ij} = (i,j)$ and intensity value I(i,j). The centroid c may be computed from $$c = \frac{\sum (I(i, j) - T) p_{ij}}{\sum I(i, j) - T}, \quad (13)$$

where I(i,j)−T=0 if T>I(i,j).

The method has now ended and provides the centroid c of each detected blob. Data representing the centroids c is stored for future use. For example the image 1 may be modified to introduce marks at the positions of the centroids c or the centroids may be used for further processing, for example to perform camera location.

Of course the method described above is not limitative and may be varied, for example by changing the order of some of the steps, or by changing the calculations employed.

The method described above detects blobs which are brighter than the background, and therefore assumes that a blob has a brighter intensity than the background. However, the method may easily be generalised to detect, additionally or alternatively, blobs which are darker than the background. This may be achieved by inverting the image 1, or by employing inverted contrast comparisons, or considering the magnitude of the intensity in the contrast comparisons.

Various steps in the method may be replaced or omitted, for example as follows.

Instead of deriving the radius $r_{max}$ at which the differential is maximum in step S4 and calculating a detection score D for just that radius $r_{max}$, it would be possible to calculate detection scores D for plural radii. However, this would increase the computational expense, as it would require more calculation that derivation of the radius $r_{max}$.

The value S of the maximum differential is used as a discriminator between multiple hits of the same blob, because it is effective to discriminate between shapes of the same class. It is, however, not strong enough to be applied for discrimination between different classes. Hence, step S5 is applied for blob detection. However the use of the value S for non-maximum suppression could be applied to other blob detection techniques.

The average intensity T around the closed curve having the radius $r_{max}$ accurately sets an adaptive threshold which allows for accurate centroid calculation. Accordingly the average intensity T may be applied to other blob detection techniques as well.

Figure 14:
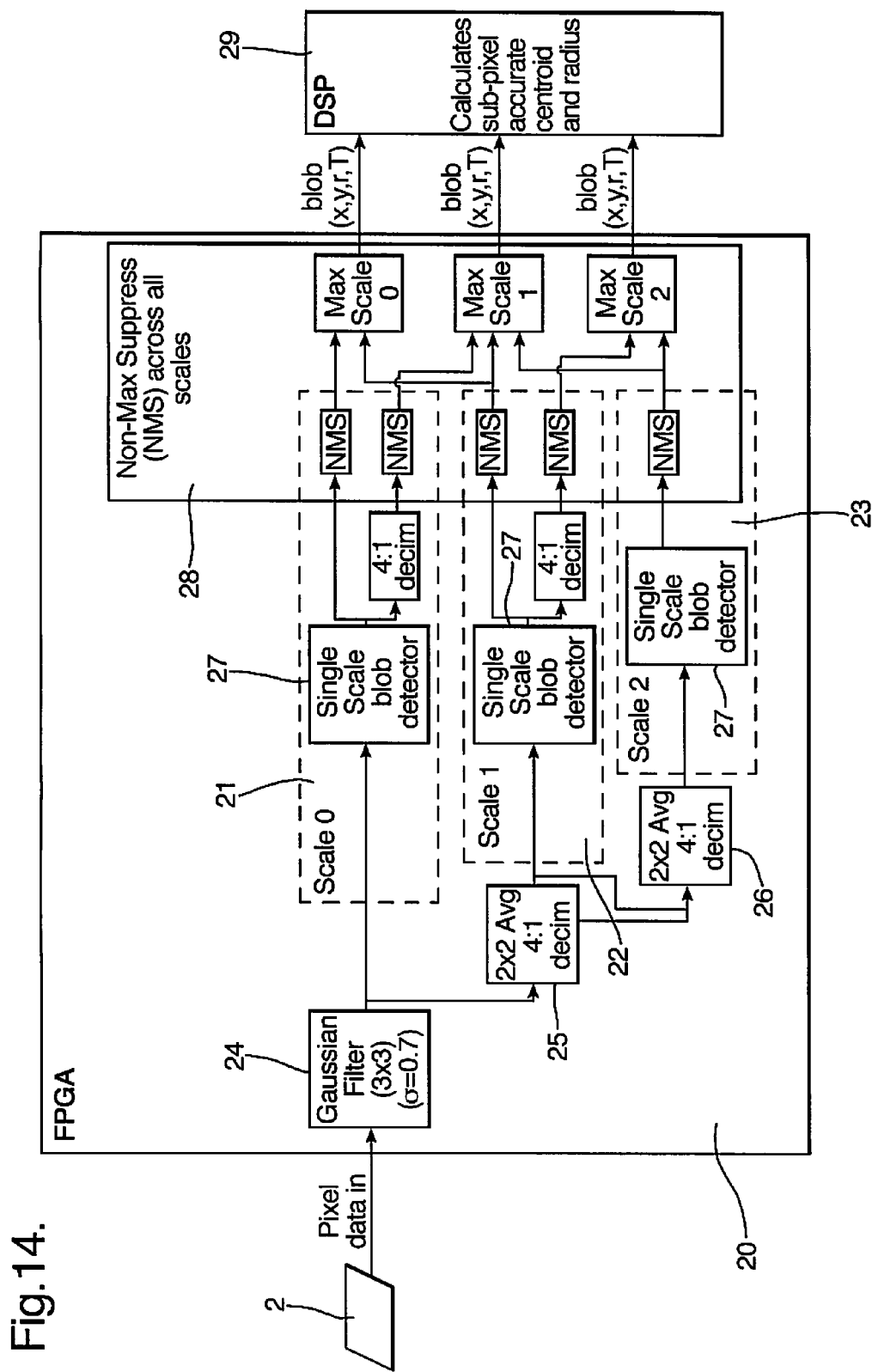
FIG. 14 is a diagram of an FPGA implementing the method.

The method may be implemented in software or hardware or a combination thereof. As an example, FIG. 14 shows an implementation on an FPGA 20, in particular as follows.

The FGPA 20 includes three analysis units 21 to 23 which implement the analysis stages 2. A Gaussian filter 24 filters the input data of the image 1 before supplying it to the analysis units 21 to 23.

The analysis units 21 to 23 operate on scales corresponding to decimation levels 0, 1 and 2. Thus the first analysis unit 21 performs no decimation. The second analysis unit 22 has a decimation unit 25 which performs decimation to level 1 of the image 1. The third analysis unit has a decimation unit 26 which performs decimation to level 2 of the output of decimation unit 25 of the second analysis unit 22.

Each of the analysis units 21 to 23 includes a blob detector 27 which implements steps S2 to S6 of the method.

The outputs of the analysis units 21 to 23 are supplied to a non-maximum suppressor 28 which implements step S7 of the method.

The outputs of the non-maximum suppressor 28 are supplied to a digital signal processor 29, arranged outside the FPGA 20 and which implements step S8 of the method.

The performance of the method has been investigated using simulations on a Dell Precision PWS490 Intel® Xeon® CPU 5130 @ 2 GHz with 2 GB of RAM. These have indicated that the method is fast enough to process single VGA images (640×480 pixels) on a single-core PC at camera rate at 4-50 frame/s. On hardware, the method might be operational at 100 frames/s at a resolution of 4 Megapixels. That is, a single VGA image can be processed in approximately 4-50 ms, depending on the parameter settings and the number of detections. This demonstrates the speed of the method.

The blob detection method has a wide range of applications including without limitation optical motion capture and photogrammetry. The blobs may be derived from fiducials or markers applied to the object being imaged. The technique provides robust detection without strict requirements on the nature and illumination of the fiducials. Thus the fiducials may be a wide range of types of object which in the image provide a blob of the desired shape with sufficiently uniform intensity on a contrasting (possibly noisy and non-uniform) background. For example, in the case of the shape being a circle, the fiducials can be spherical objects such as balls or disc-shaped objects such as round stickers, or even ink-blotches. The fiducials can be applied to any object such as a person's face or body or to a mechanical object. Furthermore, there are much lesser constraints on the illumination, as sufficient accuracy is available under normal lighting conditions.

Optical motion capture based on multiple cameras is perhaps the most prominent application. The technology developed can be seen as an extension of traditional optical motion capture using passive markers.

Passive optical systems use markers coated with retro-reflective material to reflect light back that is generated near the cameras lens. The markers then appear much brighter than their backgrounds in the captured images, so that they can be detected easily. The centroids of the markers are estimated as positions within the captured 2D images. The marker centroids are then used for 3D reconstruction. It is therefore crucial that these centroids are accurate.

Many applications require the motion capture procedure to be performed in real-time. Hence, hardware acceleration is often incorporated to compute the marker centroids on the cameras (on an FPGA or DSP). Only the 2D marker centroids are then transmitted from the cameras to a workstation PC for further processing (instead of the full-resolution images). The primary constraint of traditional optical systems is that the light in the capturing volume should be very carefully controlled. These systems are therefore not, in general, suitable for outdoors capture.

Considering the pros and cons of traditional optical motion capture, one can conclude that it is important be able to compete with the accuracy and speed of these systems. To then improve on these systems a blob detection method should operate without the help of stroboscopic lighting and reflective markers, making it more suitable to work outdoors and in low-light conditions. The present method achieves this aim.

Figure 15:
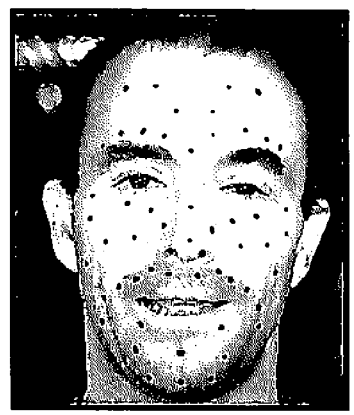
FIG. 15 is an image of a human face bearing markers.
Figure 16:
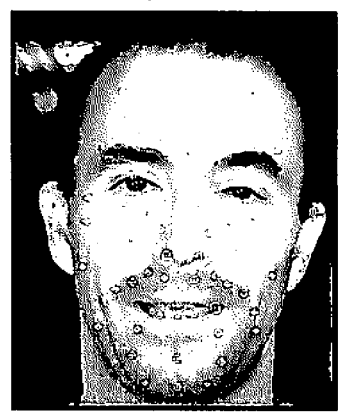
FIG. 16 is the image of FIG. 15 overlaid with dots at the positions of detected blobs.
Figure 17:
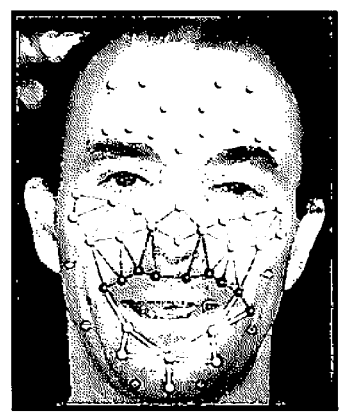
FIG. 17 is the image of FIG. 15 overlaid with a 3D construction.

Example results are illustrated in FIGS. 15 to 17. FIG. 15 is an image of a human face on which fiducials have been created simply by using eye-liner to make circular marks. The method was applied without special lighting to detect blobs in a sequence of images. The method successfully detected the marks at the positions illustrated in FIG. 16. By performing the method on images acquired from plural cameras, 3D reconstructions as shown in FIG. 17 were created using conventional motion capture techniques. Similar tests have been performed on images with significantly more background clutter but very few false positives were detected.

Other suitable applications for this technology include close range photogrammetry where geometric properties of objects are determined from photographic images, e.g., the survey of airplane wings. That is, the 3D coordinates of points on an object can, for example, be calculated from measurements made in two or more photographic images taken from different positions. This technology is also suitable for applications where fiducial detection algorithms can be applied, e.g., fiducial marker detection in anthropometric images, the automatic calibration of a single camera and general medical applications where it is important to capture the 3D data of a body part using various imaging modalities such as X-rays, MNR images, CAT scans etc.

The invention claimed is:

1. A method of detecting blobs having a predetermined shape in an image, the method comprising:
    an analysis stage comprising deriving detection scores, in respect of a plurality of positions in the image, representing the proportion of rays, out of a plurality of rays crossing a closed curve disposed at the respective position and having said predetermined shape, along which an intensity differential across the closed curve exceeds a contrast threshold; and
    detecting blobs at given positions on the basis of the detection scores.

2. A method according to claim 1, wherein said step of detecting blobs comprises detecting blobs at positions where the detection score exceeds a scoring threshold.

3. A method according to claim 1, wherein said intensity differential across the closed curve is the difference in intensity between two points along the ray in question.

4. A method according to claim 1, wherein the analysis stage further comprises, before the step of deriving detection scores, determining the size within a range of sizes at which there is a maximum in the differential of the average intensity around a closed curve, disposed at the respective position and having said predetermined shape, with respect to the size of the closed curve.

5. A method according to claim 4, wherein said step of deriving detection scores comprises deriving detection scores, in respect of the plurality of positions in the image, representing the proportion of rays, out of a plurality of rays crossing a closed curve disposed at the respective position, having said predetermined shape and being of the determined size, along which the intensity differential across the closed curve exceeds a contrast threshold.

6. A method according to claim 4, further comprising, in respect of each detected blob: deriving a blob-separation threshold which is the average intensity around the closed curve of the determined size, segmenting pixels of the detected blob on the basis of the blob-separation threshold, and deriving a centroid of the segmented pixels of the detected blob.

7. A method according to claim 6, wherein the step of segmenting pixels of the detected blob is performed on the basis of the determined size, as well as the blob-separation threshold.

8. A method according to claim 4, wherein the analysis stage further comprises, subsequent to the step of determining the size of a closed curve, deriving the value of said maximum in said differential.

9. A method according to claim 8, wherein the analysis stage further comprises, suppressing detection scores for which the value of said maximum in said differential is not the maximum within a group of detection scores in respect of adjacent positions.

10. A method according to claim 8, wherein the analysis stage is repeated in respect of closed curves at a plurality of different scales, and the analysis stage further comprises suppressing detection scores for which the value of said maximum in said differential is not the maximum within a group of detection scores in respect of the same position at different scales.

11. A method according to claim 1, wherein the analysis stage is performed in respect of closed curves at each of a plurality of different scales.

12. A method according to claim 1, wherein the analysis stage comprises initially performing an elimination step comprising deriving an elimination score, in respect of a plurality of positions in the image, representing a measure of the contrast between pixels inside and outside the closed curve having said predetermined shape, further analysis not being performed in respect of any position at which the elimination score exceeds an elimination contrast threshold.

13. A method according to claim 12, wherein the elimination score represents, on the basis of a set of pixel pairs each consisting of a pixel inside and a pixel outside the closed curve having said predetermined shape, the proportion of pixel pairs in the set in which the intensities of the first and second pixels meets a predetermined criterion.

14. A method according to claim 13, wherein the predetermined criterion is that the difference in intensity between the two pixels exceeds an elimination threshold.

15. A method according to claim 1, wherein the predetermined shape is a circle.

16. A method according to claim 1, wherein the method comprises pre-filtering the image to reduce noise before said analysis stage.

17. A method according to claim 1, wherein the method is performed on a sequence of images provided at a video frame rate.

18. A method according to claim 17, wherein the method is performed in real time on the sequence of images provided at a video frame rate.

19. A method according to claim 1, further comprising storing data representing the positions of the detected blobs.

20. A method according to claim 1, further comprising outputting a signal identifying the positions of the detected blobs.

21. A method of detecting blobs having a predetermined shape in an image, the method comprising:
  detecting blobs at given positions in the image;
  determining the size within a range of sizes at which there is a maximum in the differential of an average intensity around a closed curve, disposed at the respective position and having said predetermined shape, with respect to the size of the closed curve; and in respect of each detected blob:
  deriving a blob-separation threshold which is the average intensity around the closed curve of the determined size;
  segmenting pixels of the detected blob on the basis of the blob-separation threshold, and deriving a centroid of the segmented pixels of the detected blob.

22. A method according to claim 21, wherein the step of segmenting pixels of the detected blob is performed on the basis of the determined size, as well as the blob-separation threshold.

23. A method according to claim 21, further comprising an analysis stage comprising deriving detection scores, in respect of a plurality of positions in the image, representing the proportion of rays, out of a plurality of rays crossing a closed curve disposed at the respective position and having said predetermined shape and being of the determined size, along which the intensity differential across the closed curve exceeds a contrast threshold, the step of detecting blobs at given positions in the image being performed on the basis of the detection scores.

24. A method according to claim 23, wherein said step of detecting blobs comprises detecting blobs at positions where the detection score exceeds a scoring threshold.

25. A method according to claim 23, wherein said intensity differential across the closed curve is the difference in intensity between two points along the ray in question.

26. A method according to claim 23, wherein the analysis stage further comprises, subsequent to the step of determining the size of a closed curve, deriving the value of said maximum in said differential.

27. A method according to claim 26, wherein the analysis stage further comprises suppressing detection scores for which the value of said maximum in said differential is not the maximum within a group of detection scores in respect of adjacent positions.

28. A method according to claim 26, wherein the analysis stage is performed in respect of closed curves at a each of plurality of different scales, and the analysis stage further comprises suppressing detection scores for which the value of said maximum in said differential is not the maximum within a group of detection scores in respect of the same position at different scales.

29. A method according to claim 23, wherein the analysis stage is performed in respect of closed curves at a each of a plurality of different scales.

30. A method according to claim 23, wherein the analysis stage comprises initially performing an elimination step comprising deriving an elimination score, in respect of a plurality of positions in the image, representing a measure of the contrast between pixels inside and outside the closed curve having said predetermined shape, further analysis not being performed in respect of any position at which the elimination score exceeds an elimination contrast threshold.

31. A method according to claim 30, wherein the elimination score represents, on the basis of a set of pixel pairs each consisting of a pixel inside and a pixel outside the closed curve having said predetermined shape, the proportion of pixel pairs in the set in which the intensities of the first and second pixels meets a predetermined criterion.

32. A method according to claim 31, wherein the predetermined criterion is that the difference in intensity between the two pixels exceeds an elimination threshold.

33. A method according to claim 21, wherein the predetermined shape is a circle.

34. A method according to claim 21, wherein the method comprises pre-filtering the image to reduce noise before said analysis stage.

35. A method according to claim 21, wherein the method is performed on a sequence of images provided at a video frame rate.

36. A method according to claim 35, wherein the method is performed in real time on the sequence of images provided at a video frame rate.

37. A method according to claim 21, further comprising storing data representing the centroids of the detected blobs.

38. A method according to claim 21, further comprising outputting a signal identifying the centroids of the detected blobs.

39. An apparatus for detecting blobs having a predetermined shape in an image, the apparatus comprising:
an analysis unit comprising a detection score calculator operative to derive detection scores, in respect of a plurality of positions in the image, representing the proportion of rays, out of a plurality of rays crossing a closed curve disposed at the respective position and having said predetermined shape, along which an intensity differential across the closed curve exceeds a contrast threshold; and
a detection unit operative to detect blobs at given positions on the basis of the detection scores.

40. An apparatus according to claim 39, wherein the decision unit is arranged to detect blobs at positions where the detection score exceeds a scoring threshold.

41. An apparatus according to claim 39, wherein said intensity differential across the closed curve is the difference in intensity between two points along the ray in question.

42. An apparatus according to claim 39, wherein the analysis unit further comprises a size calculator operative to determine the size within a range of sizes at which there is a maximum in the differential of the average intensity around a closed curve disposed at the respective position and having said predetermined shape with respect to the size of the closed curve.

43. An apparatus according to claim 42, wherein the detection score generator is operative to derive detection scores, in respect of the plurality of positions in the image, representing the proportion of rays, out of a plurality of rays crossing a closed curve disposed at the respective position, having said predetermined shape and being of the determined size, along which the intensity differential across the closed curve exceeds a contrast threshold.

44. An apparatus according to claim 42, further comprising a centroid calculator operative, in respect of each detected blob: to derive a blob-separation threshold which is the average intensity around the closed curve of the determined size, to segment pixels of the detected blob on the basis of the blob-separation threshold; and to derive the centroid of the segmented pixels of the detected blob.

45. An apparatus according to claim 44, wherein the centroid calculator is operative to segment pixels of the detected blob on the basis of the determined size, as well as the blob-separation threshold.

46. An apparatus according to claim 39, wherein the size calculator is further operative to derive the value of said maximum in said differential.

47. An apparatus according to claim 46, further comprising a non-maximum suppressor operative to suppress detection scores for which the value of said maximum in said differential is not the maximum within a group of detection scores in respect of adjacent positions.

48. An apparatus according to claim 46, wherein the analysis unit is operative in respect of closed curves at a plurality of different scales, and the apparatus further comprises a non-maximum suppressor operative to suppress detection scores for which the value of said maximum in said differential is not the maximum within a group of detection scores in respect of the same position at different scales.

49. An apparatus according to claim 39, wherein the analysis unit is operative in respect of closed curves at a plurality of different scales.

50. An apparatus according to claim 39, wherein the analysis unit comprises an elimination stage operative before the remainder of the analysis unit to derive an elimination score, in respect of a plurality of positions in the image, representing a measure of the contrast between pixels inside and outside the closed curve having said predetermined shape, the remainder of the analysis unit not being operative in respect of any position at which the elimination score exceeds an elimination contrast threshold.

51. An apparatus according to claim 50, wherein the elimination score represents, on the basis of a set of pixel pairs each consisting of a pixel inside and a pixel outside the closed curve having said predetermined shape, the proportion of pixel pairs in the set in which the intensities of the first and second pixels meets a predetermined criterion.

52. An apparatus according to claim 51, wherein the predetermined criterion is that the difference in intensity between the two pixels exceeds an elimination threshold.

53. An apparatus according to claim 39, wherein the predetermined shape is a circle.

54. An apparatus according to claim 39, wherein the apparatus further comprises a filter operative to pre-filter the image to reduce noise before supply to the analysis unit.

55. An apparatus according to claim 39, wherein the apparatus is operative on a sequence of images provided at a video frame rate.

56. An apparatus according to claim 55, wherein the apparatus is operative in real time on the sequence of images provided at a video frame rate.

57. An apparatus according to claim 39, wherein the decision unit is operative to store data representing the positions of the detected blobs.

58. An apparatus according to claim 39, wherein the decision unit is operative to output a signal identifying the positions of the detected blobs.

59. An apparatus for detecting blobs having a predetermined shape in an image, the apparatus comprising:
- a detection unit operative to detect blobs at given positions in the image;
- a size calculator operative to determine the size within a range of sizes at which there is a maximum in the differential of an average intensity around a closed curve disposed at the respective position and having said predetermined shape with respect to the size of the closed curve; and
- a centroid calculator operative, in respect of each detected blob, to derive a blob-separation threshold which is the average intensity around the closed curve of the determined size;
- to segment pixels of the detected blob on the basis of the blob-separation threshold, and to derive the centroid of the segmented pixels of the detected blob.

60. An apparatus according to claim 59, wherein the centroid calculator is operative to segment pixels of the detected blob on the basis of the determined size, as well as the blob-separation threshold.

61. An apparatus according to claim 59, further comprising an analysis unit comprising a detective score calculator operative to derive detection scores, in respect of a plurality of positions in the image, representing the proportion of rays, out of a plurality of rays crossing a closed curve disposed at the respective position and having said predetermined shape and being of the determined size, along which the intensity differential across the closed curve exceeds a contrast threshold, the detection unit being operative to detect blobs at given positions in the image on the basis of the detection scores.

62. An apparatus according to claim 61, wherein the decision unit is arranged to detect blobs at positions where the detection score exceeds a scoring threshold.

63. An apparatus according to claim 61, wherein said intensity differential across the closed curve is the difference in intensity between two points along the ray in question.

64. An apparatus according to claim 61, wherein the size calculator is further operative to derive the value of said maximum in said differential.

65. An apparatus according to claim 64, further comprising a non-maximum suppressor operative to suppress detection scores for which the value of said maximum in said differential is not the maximum within a group of detection scores in respect of adjacent positions.

66. An apparatus according to claim 64, wherein the analysis unit is operative in respect of closed curves at a plurality of different scales, and the apparatus further comprises a non-maximum suppressor operative to suppress detection scores for which the value of said maximum in said differential is not the maximum within a group of detection scores in respect of the same position at different scales.

67. An apparatus according to claim 61, wherein the analysis unit is operative in respect of closed curves at a plurality of different scales.

68. An apparatus according to claim 61, wherein the analysis unit comprises an elimination stage operative before the remainder of the analysis unit to derive an elimination score, in respect of a plurality of positions in the image, representing a measure of the contrast between pixels inside and outside the closed curve having said predetermined shape, the remainder of the analysis unit not being operative in respect of any position at which the elimination score exceeds an elimination contrast threshold.

69. An apparatus according to claim 61, wherein the elimination score represents, on the basis of a set of pixel pairs each consisting of a pixel inside and a pixel outside the closed curve having said predetermined shape, the proportion of pixel pairs in the set in which the intensities of the first and second pixels meets a predetermined criterion.

70. An apparatus according to claim 69, wherein the predetermined criterion is that the difference in intensity between the two pixels exceeds an elimination threshold.

71. An apparatus according to claim 59, wherein the predetermined shape is a circle.

72. An apparatus according to claim 59, wherein the apparatus further comprises a filter operative to pre-filter the image to reduce noise before supply to the analysis unit.

73. An apparatus according to claim 59, wherein the apparatus is operative on a sequence of images provided at a video frame rate.

74. An apparatus according to claim 73, wherein the apparatus is operative in real time on the sequence of images provided at a video frame rate.

75. An apparatus according to claim 59, wherein the decision unit is operative to store data representing the centroids of the detected blobs.

76. An apparatus according to claim 59, wherein the decision unit is operative to output a signal identifying the centroids of the detected blobs.

* * * * *